(12) United States Patent
Luo et al.

(10) Patent No.: US 8,493,363 B2
(45) Date of Patent: Jul. 23, 2013

(54) TOUCH DEVICE AND TOUCH METHOD

(75) Inventors: Wen-Dong Luo, Shenzhen (CN); Wen-Wu Wang, Shenzhen (CN); Bin Liu, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 171 days.

(21) Appl. No.: 13/234,107

(22) Filed: Sep. 15, 2011

(65) Prior Publication Data

US 2013/0033454 A1    Feb. 7, 2013

(30) Foreign Application Priority Data

Aug. 5, 2011    (CN) .......................... 2011 1 0224321

(51) Int. Cl.
*G06F 3/042* (2006.01)
(52) U.S. Cl.
USPC .......................................................... 345/175

(58) Field of Classification Search
None
See application file for complete search history.

(56) References Cited

U.S. PATENT DOCUMENTS

| | | | |
|---|---|---|---|
| 2011/0175848 A1* | 7/2011 | Chen | 345/175 |
| 2012/0013576 A1* | 1/2012 | Chung et al. | 345/175 |
| 2012/0169667 A1* | 7/2012 | Lu et al. | 345/175 |
| 2012/0249485 A1* | 10/2012 | Ye et al. | 345/175 |

* cited by examiner

*Primary Examiner* — Jason Olson
(74) *Attorney, Agent, or Firm* — Altis Law Group, Inc.

(57) ABSTRACT

A touch method is applied in a touch device. The touch device includes a display unit, first infrared receivers, first infrared emitters, second infrared receivers, second infrared emitters, a storage unit, and motors. The first infrared receivers and the first infrared emitters are arranged on a first side of the display unit, and the second infrared receivers and the second infrared emitters are arranged on a second side of the display unit. The storage unit stores a table recording a relationship between identification and set of coordinates of the infrared receivers. The method includes: controlling motors to drive infrared emitters and infrared receivers to rotate; determining whether electrical signals comprising the identification of one first infrared receiver and one second infrared receiver are simultaneously received; if yes, determining the set of coordinates of the touch spot; determining an icon and determining the corresponding function corresponding to the touch spot.

18 Claims, 5 Drawing Sheets

TOUCH DEVICE AND TOUCH METHOD

BACKGROUND

1. Technical Field

The present disclosure relates to touch devices and touch methods and, particularly, to a touch device capable of being touch-operated without contacting a touch screen of the device and a touch method for said device.

2. Description of Related Art

Infrared touch screens are widely applied in electronic devices. When an object touches the infrared touch screen, an infrared ray emitted by an infrared emitter is blocked, and then an electronic device with the infrared touch screen determines which infrared receiver does not receive the infrared ray, to determine which point has been touched, and executes a corresponding function. A shortcoming with the infrared touch screen is that physical contact must be made with the screen to cause the electronic device to execute a function, thus the user must be physically close to the screen, which may be harmful to the eyes of the user if the electronic device is being operated for a relatively long time.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The embodiments of the present disclosure are now described in detail, with reference to the accompanying drawings.

Figure 1:
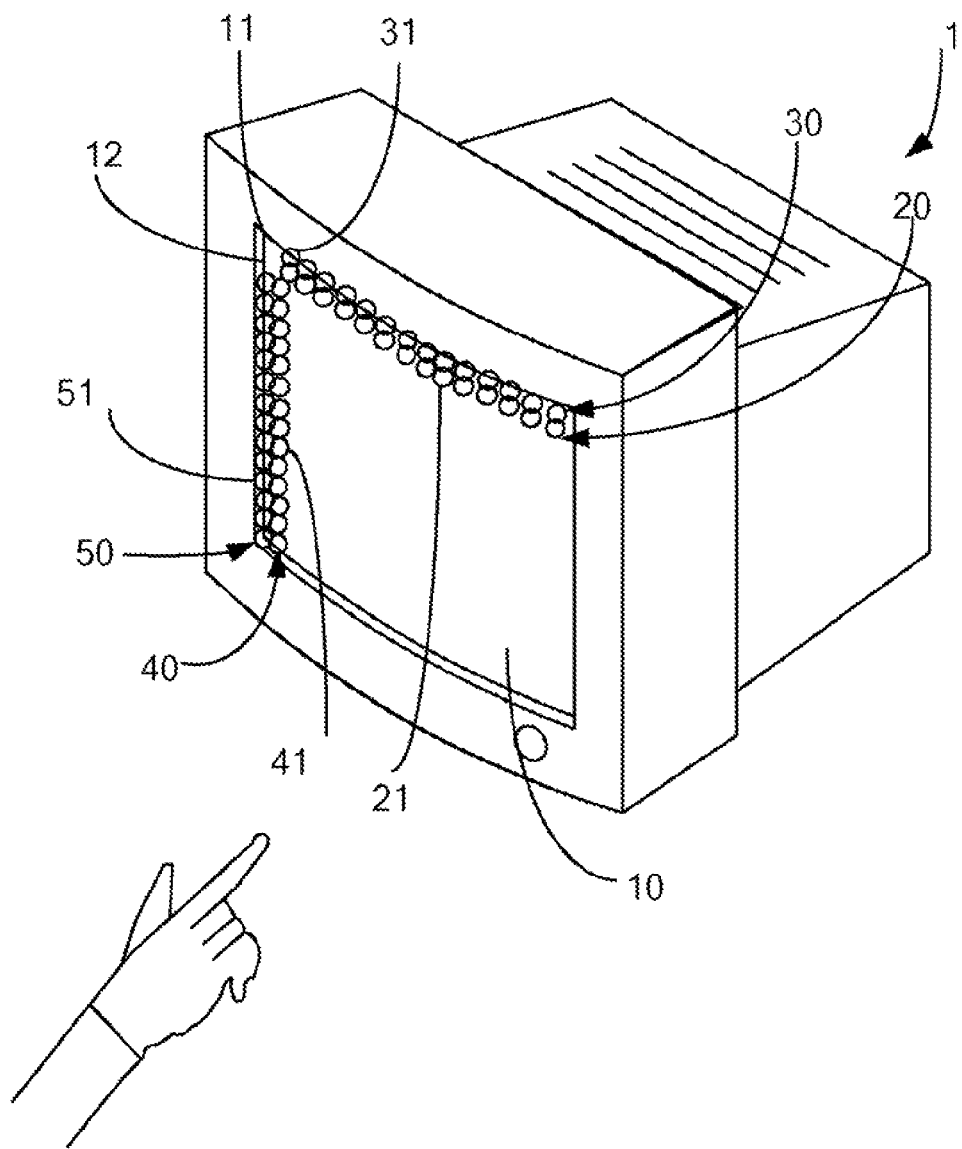
FIG. 1 is a schematic view of a touch device in accordance with an exemplary embodiment.
Figure 2:
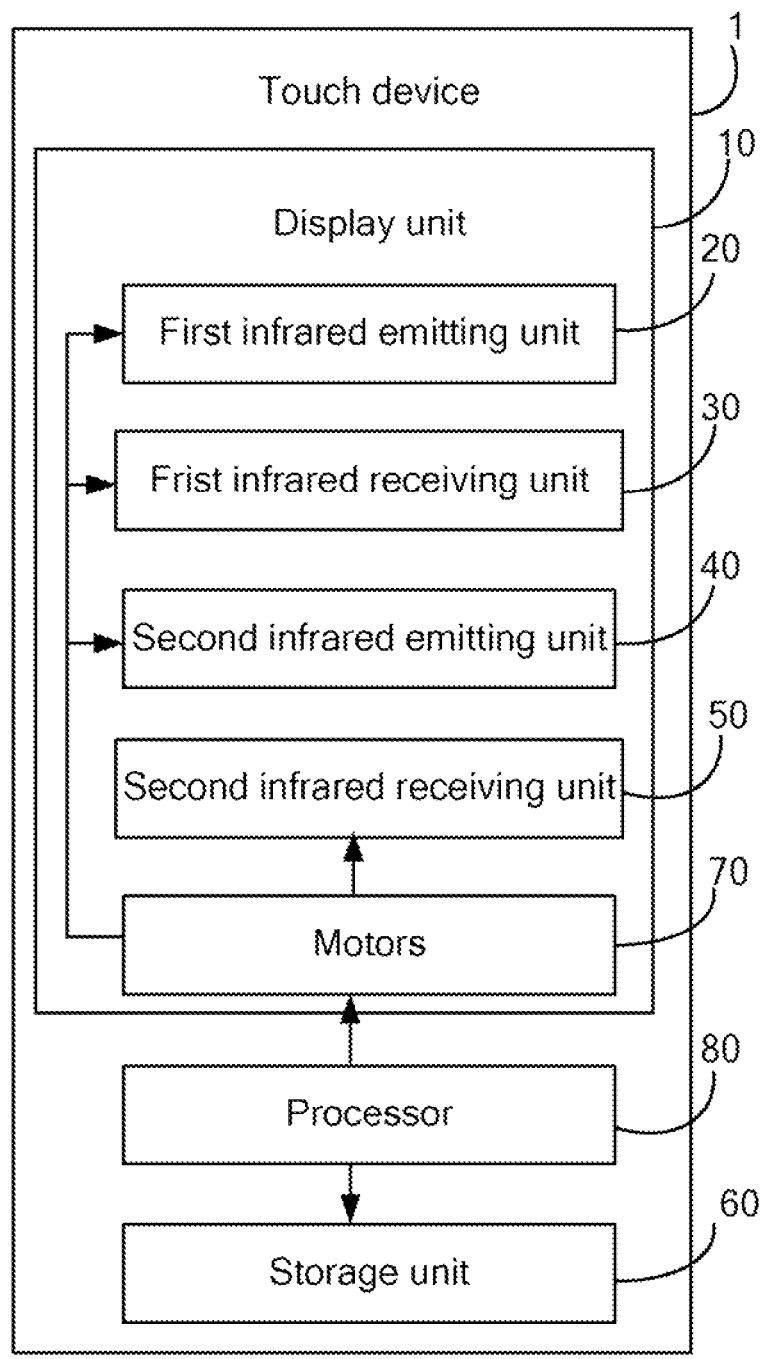
FIG. 2 is a block diagram of the touch device as FIG. 1 in accordance with an exemplary embodiment.

Referring to FIGS. 1-2, a touch device 1 includes a display unit 10, a first infrared emitting unit 20, a first infrared receiving unit 30, a second infrared emitting unit 40, a second infrared receiving unit 50, a storage unit 60, a number of motors 70, and a processor 80.

The first infrared emitting unit 20 includes a number of first infrared emitters 21. The second infrared emitting unit 40 includes a number of second infrared emitters 41. The first infrared receiving unit 30 includes a number of first infrared receivers 31. The second infrared receiving unit 50 includes a number of second infrared receivers 51. In the embodiment, the number of the first infrared emitters 21 is the same as that of the first infrared receivers 31, and each first infrared emitter 21 corresponds to one first infrared receiver 31. The number of the second infrared emitters 41 is the same as that of the second infrared receivers 51, and each second infrared emitter 41 corresponds to one second infrared receiver 51. Each infrared receiver 31, 51 include identification for identifying itself. In the embodiment, each infrared emitter 21, 41 emit a different infrared ray within its preset frequency ranges. Each infrared receiver 31, 51 can only receive the infrared ray emitted by its corresponding infrared emitter 21, 41.

The first infrared emitters 21 and the first infrared receivers 31 are arranged on a first side 11 of the display unit 10 and are rotatable relative to the first side 11. The second infrared emitters 41 and the second infrared receivers 51 are arranged on a second side 12 of the display unit 10 adjacent to the first side 11 of the display unit 10 and are rotatable relative to the second side 12. In the embodiment, the first side 11 is the upper side of the display unit 10, and the second side 12 is the left side of the display unit 10. However, the positions of the first side 11 and the second side 12 can be changed according to need and are not limited to the description.

Figure 3:
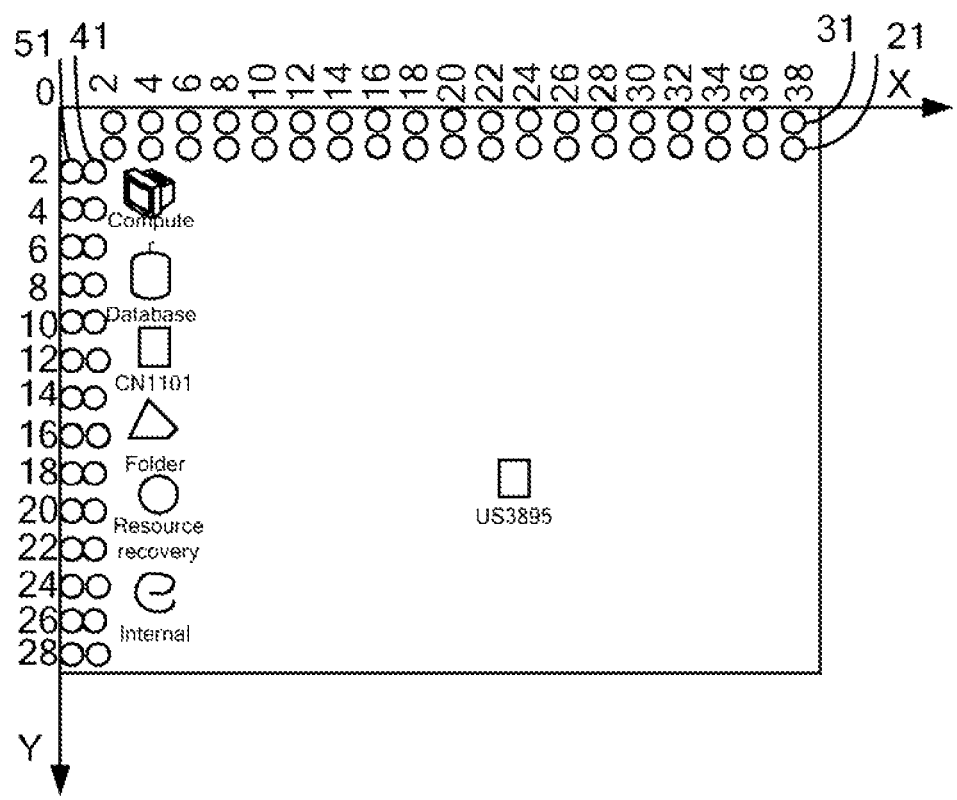
FIG. 3 is a schematic view showing a system of coordinates of a number of infrared emitters and infrared receivers of the touch device of FIG. 1.

Referring also to FIG. 3, each first infrared receiver 31 corresponds to one set of coordinates in the Descartes coordinate system. Each second infrared receiver 51 corresponds to another set of coordinates in the Descartes coordinate system. In the embodiment, each first infrared receiver 31 represents one abscissa in the Descartes coordinate system, each second infrared receiver 51 represents one ordinate in the Descartes coordinate system, and the coordinate origin is the intersection of the first side 11 and the second side 12. In an alternative embodiment, the coordinate origin may be the middle of the first side 11, or the middle of the second side 12. The abscissa of each first infrared emitter 21 is the same as that of its corresponding first infrared receiver 31, and the ordinate of each second infrared emitter 41 is the same as that of its corresponding second infrared receiver 51. In the embodiment, the distance between two adjacent first infrared emitters 21 is the same as that between two adjacent second infrared emitters 41. The distance between two adjacent first infrared receivers 31 is the same as that between two adjacent second infrared receivers 51.

The storage unit 60 stores a table recording the relationship between the identification of each infrared receiver 31, 51 and the corresponding set of coordinates of the infrared receiver. In the embodiment, the table includes a first column recording the identification of each infrared receiver 31, 51 and a second column recording the set of coordinates of each infrared receiver 31, 51.

TABLE

| Identification | Set of coordinates |
|---|---|
| 001 | (2, 0) |
| ... | ... |
| 003 | (6, 0) |
| ... | |
| 011 | (0, 10) |
| ... | ... |

The motors 70 are arranged on the display unit 10. Each motor 70 is electrically connected to one infrared emitter 21 or 41 and its corresponding infrared receiver 31 or 51 to drive one infrared emitter 21, 41 and its corresponding infrared receiver 31, 51 to rotate.

The processor 80 is electrically connected to the motors 70 and the infrared receivers 31, 51. The processor 80 controls the motors 70 to drive each infrared emitter 21, 41 and each infrared receiver 31, 51 to periodically rotate. The angle between each first infrared emitter 21 and the first side 11 is changed from 0 degree to 90 degree or from 90 degree to 0 degree when the first infrared emitter 21 is driven to rotate. The angle between each second infrared emitter 41 and the second side 12 is also changed from 0 degree to 90 degree or from 90 degree to 0 degree when the infrared emitter 41 is driven to rotate. The angle between each first infrared receiver 31 and the first side 11 is changed from 0 degree to 90 degree or from 90 degree to 0 degree when the first infrared receiver 31 is driven to rotate. The angle between each second infrared receiver 51 and the second side 12 is also changed from 0 degree to 90 degree or from 90 degree to 0 degree when the infrared receiver 51 is driven to rotate. The angle between each infrared receiver 31 and its corresponding infrared emitter 21 stays unchanged when the infrared receiver 31 and its corresponding infrared emitter 21 are driven to rotate.

To form a touch spot corresponding to one icon displayed on the display unit 10, the processor 80 controls the motors 70 to drive the infrared emitters 21, 41 and the infrared receivers 31, 51 to rotate, which causes the infrared rays emitted by the first infrared emitters 21 and the infrared rays emitted by the second infrared emitters 41 to intersect forming a touch spot in the air. In the embodiment, the processor 80 controls the motors 70 to drive the infrared emitters 21, 41 and the infrared receivers 31, 51 to rotate at a high speed. Each first infrared emitter 21 has a rotation period. Each second infrared emitter 41 has a rotation period. The rotation period of the first infrared emitter 21 and its corresponding first infrared receiver 31 is the same, and the rotation period of the second infrared emitter 41 and its corresponding second infrared receiver 51 is the same. The rotation speed of each infrared emitters 21, 41 are different, causing the rotation period of each infrared emitters 21, 41 to be different and relatively short. Thus, any icon displayed on the display unit 10 can be corresponding to one touch spot intersected by the infrared rays emitted by the first infrared emitters 21 and the infrared rays emitted by the second infrared emitters 41 for a maximum rotation period of the infrared emitter 21, 41.

When a touch spot is touched by an object, the infrared ray emitted by one of the first infrared emitters 21 and the infrared ray emitted by one of the second infrared emitters 41 may be blocked by the object and reflected to its corresponding first infrared receiver 31 and its corresponding second infrared receiver 51. The infrared receivers 31, 51 receiving the infrared rays respectively generate corresponding electrical signal including the identification of the infrared receivers 31, 51. The processor 80 determines the abscissa of the first infrared receiver 31 and the ordinate of the second infrared receiver 51 to determine the set of coordinates of the touch spot according to the table and the electrical signal, and further determine the corresponding icon displayed on the display unit 10 to execute the corresponding function. In this embodiment, as the touch spot is formed in the air, the user can be physically away from the display unit 10 to operate the device to protect the eyes of the user.

Figure 4:
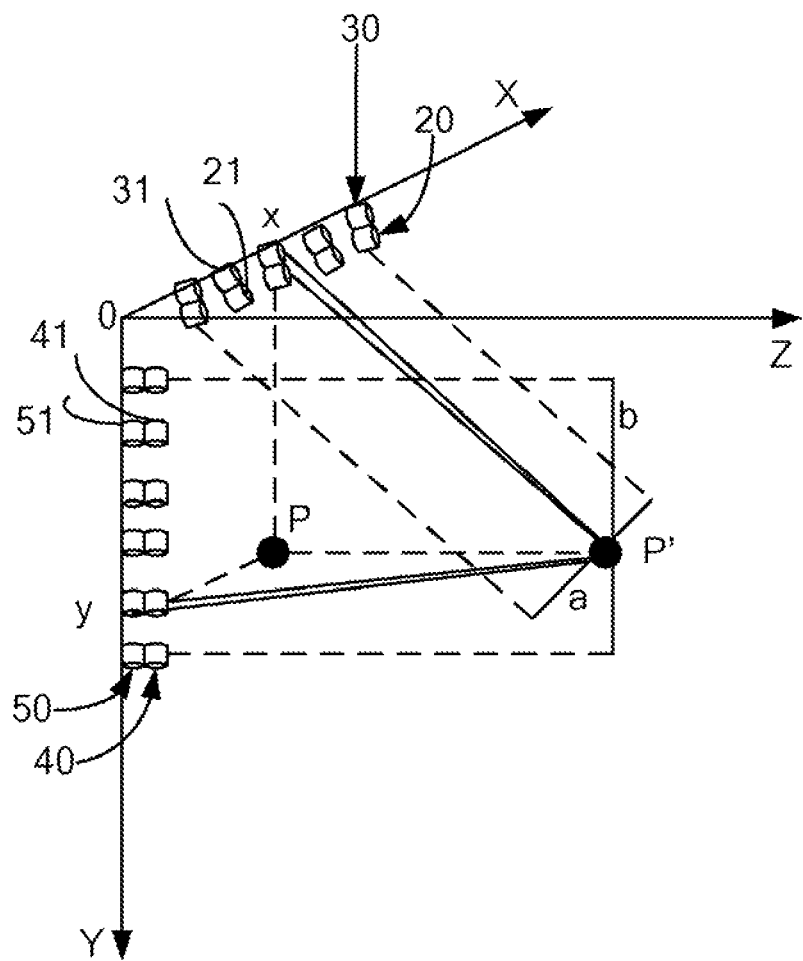
FIG. 4 is a schematic diagram showing how to determine a touch spot.

Referring also to FIG. 4, the following example is employed to illustrate the principle of the present disclosure. In this example, the set of coordinates of the infrared receiver 31 which identification is 003 is (6,0), and the set of coordinates of the infrared receiver 51 which identification is 011 is (0, 10). When the processor 80 simultaneously receives one electrical signal including the identification 003 from the infrared receiver 31 and an electrical signal including the identification 011 from the infrared receiver 51, the processor 80 determines that the abscissa of the infrared receiver 31 is six according to the electrical signal from the infrared receiver 31, and the ordinate of the infrared receiver 51 is ten according to the electrical signal from the infrared receiver 51, determines that the set of coordinates of the touch spot formed by the infrared rays emitted by the infrared receivers 31, 51 is (6,10), and further determines the icon corresponding to the touch spot. In FIG. 4, a is the abscissa of the first infrared receiver 31, b is the ordinate of the second infrared receiver 51, P' is the touch spot in the air, and P is the icon displayed on the display unit 10.

Figure 5:
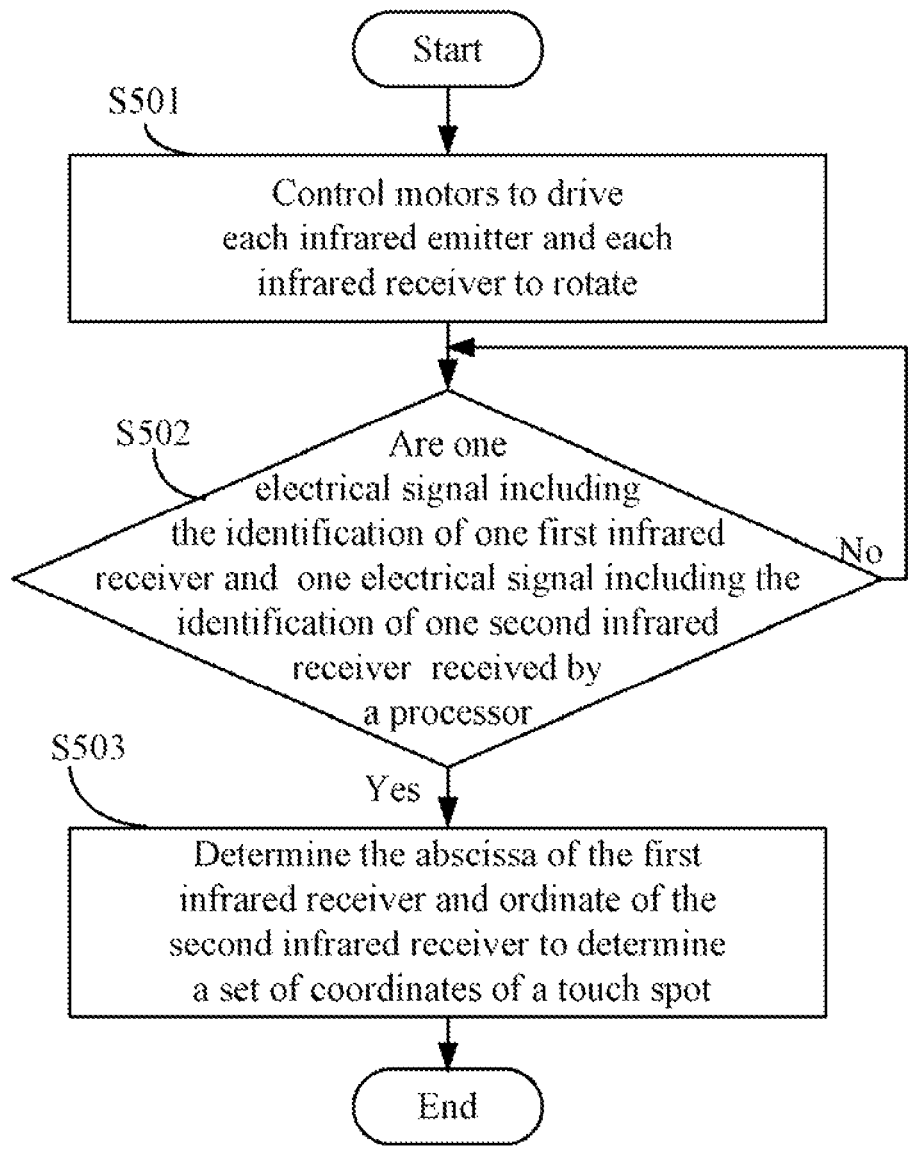
FIG. 5 is a flowchart of a touch method implemented by the touch device of FIG. 1, in accordance with an exemplary embodiment.

Referring to FIG. 5, a flowchart of a touch method applied on the touch device 1 in accordance with an exemplary embodiment is shown.

In step S501, the processor 80 periodically controls the motors 70 to drive the infrared emitters 21, 41 and the infrared receivers 31, 51 to rotate.

In step S502, the processor 80 determines whether one electrical signal including the identification of one of the first infrared receivers 31 and one electrical signal including the identification of one of the infrared receivers 51 are received simultaneously. If yes, the procedure goes to step S503. If no, the procedure continues to execute step S502.

In step S503, the processor 80 determines the abscissa of the first infrared receiver 31 according to the identification in the electrical signal from the first infrared receiver 31 and the table, and the ordinate of the second infrared receiver 51 according to the identification in the electrical signal from the second infrared receiver 51 and the table, to determine the set of coordinates of a touch spot, and further determine the icon corresponding to the touch spot to execute the function of the icon.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A touch device comprising:
a display unit;
a first infrared emitting unit arranged on a first side of the display unit, the first infrared emitting unit comprising a plurality of first infrared emitters, each of the first infrared emitters to emit an infrared ray;
a first infrared receiving unit arranged on the first side of the display unit, the first infrared receiving unit comprising a plurality of first infrared receivers, each of the first infrared receivers corresponding to one of the first infrared emitters, each of the first infrared receivers comprising an identification identifying itself, each of the first infrared receivers to receive the infrared rays emitted by its corresponding first infrared emitter, and generate an electrical signal comprising the identification of the first infrared receiver when receiving an infrared ray emitted by its corresponding first infrared emitter, each of the first infrared receivers corresponding to one set of coordinates;
a second infrared emitting unit arranged on a second side of the display unit adjacent to the first side of the display unit, the second infrared emitting unit comprising a plurality of first infrared emitters, the infrared emitters to emit infrared rays;
a second infrared receiving unit arranged on the second side of the display unit, the second infrared receiving unit comprising a plurality of second infrared receivers, each of the second infrared receivers corresponding to one of the second infrared emitters, each of the second infrared receiver comprising an identification identifying itself, each of the second infrared receivers to receive the infrared rays emitted by its corresponding second infrared emitter, and generate an electrical signal comprising the identification of the second infrared receiver when receiving an infrared ray emitted by its corresponding second infrared emitters, each of the second infrared receivers corresponding to one set of coordinates;

a storage unit storing a table recording a relationship between the identification of each of the first infrared receivers and the corresponding set of coordinates of the first infrared receiver, and between the identification of each of the second infrared receivers and the corresponding set of coordinates of the second infrared receiver;

a plurality of motors, each of the motors electrically connected to one of the first infrared emitters and its corresponding first infrared receiver to drive the first infrared emitter and its corresponding first infrared receiver to rotate, or connected to one of the second infrared emitters and its corresponding second infrared receiver to drive the second infrared emitter and its corresponding second infrared receiver to rotate; and a processor electrically connected to each of the motors, each of the first infrared receivers, and each of the second infrared receivers, the processor to control the motors to drive the first infrared emitters, the second infrared emitters, the first infrared receivers, and the second infrared receivers to rotate, wherein, when the electrical signal from one of the first infrared receivers and the electrical signal from one of the second infrared receivers are simultaneously received, the processor determines the corresponding set of coordinates of the first infrared receiver according to the identification in the electrical signal from the first infrared receiver and the table, the set of coordinates of the second infrared receiver according to the identification in the electrical signal from the second infrared receiver and the table, and a set of coordinates of a touch spot formed by the infrared rays from the first infrared receiver and the second infrared receiver according to the sets of coordinates of the first infrared receiver and the second infrared receiver, determines an icon corresponding to the touch spot, and further execute the corresponding function according to the touch spot.

2. The touch device as described in claim 1, wherein the table comprises a first column recording the identification of each of the first infrared receivers and each of the second infrared receivers, and a second column recording the set of coordinates of each of the first infrared receivers and each of the second infrared receivers.

3. The touch device as described in claim 1, wherein the angle between the first infrared emitters and the first side is from 0 degree to 90 degree or from 90 degree to 0 degree when the first infrared emitter is driven to rotate, the angle between the second infrared emitters and the second side is from 0 degree to 90 degree or from 90 degree to 0 degree when the second infrared emitter is driven to rotate, the angle between the first infrared receivers and the first side is from 0 to 90 degree or from 90 degree to 0 degree when the first infrared receiver is driven to rotate, and the angle between the second infrared receivers and the display unit is from 0 degree to 90 degree or from 90 degree to 0 degree when the second infrared receiver is driven to rotate.

4. The touch device as described in claim 1, wherein the processor controls the motors to drive each of the first infrared emitters and its corresponding infrared receiver to rotate in a different speed, and drive each of the second infrared emitters and its corresponding infrared receiver to rotate in a different speed.

5. The touch device as described in claim 1, wherein each of the infrared emitting units emits an infrared ray within its preset frequency range, the frequency ranges of the infrared rays emitted by different first infrared emitters and different second infrared emitters are different, each of the infrared receivers receives the infrared ray emitted by its corresponding infrared emitter.

6. The touch device as described in claim 1, wherein each of the first infrared receivers corresponds to one abscissa in the Descartes coordinate system, each of the second infrared receivers corresponds to one ordinate in the Descartes coordinate system.

7. The touch device as described in claim 6, wherein the coordinate origin is the intersection of the first side and the second side.

8. The touch device as described in claim 6, wherein the abscissa of each of the first infrared emitters is the same as that of its corresponding first infrared receiver, and the ordinate of each of the second infrared emitters is the same as that of its corresponding second infrared receiver.

9. The touch device as described in claim 1, wherein the distance between each two adjacent first infrared emitters is the same as that between each two adjacent second infrared emitters, and the distance between each two adjacent first infrared receivers is the same as that between each two adjacent second infrared receivers.

10. A touch method applied in a touch device, the touch device comprising a display unit, a plurality of first infrared receivers, a plurality of first infrared emitters, a plurality of second infrared receivers, a plurality of second infrared emitters, a storage unit, and a plurality of motors, the first infrared receivers and the first infrared emitters being arranged on a first side of the display unit, the second infrared receivers and the second infrared emitters being arranged on a second side of the display unit, each of the first infrared receiver comprising an identification to identifying itself, and generating an electrical signal comprising an identification of the first infrared receiver when receives a ray emitted by its corresponding first infrared emitter, each of the second infrared receiver comprising an identification to identifying itself, and generating an electrical signal comprising an identification of the second infrared receiver when receives a ray emitted by its corresponding second infrared emitter, each of the first infrared receivers corresponding to one set of coordinates, each of the second infrared receivers corresponding to another set of coordinates, the storage unit storing a table recording a relationship between the identification of each first infrared receiver and the corresponding set of coordinates of first infrared receiver, and between the identification of each second infrared receiver and the corresponding set of coordinates of second infrared receiver, each of the motors being electrically connected to one first infrared emitter and its corresponding first infrared receiver, or one second infrared emitter and its corresponding second infrared receiver, the method comprising:

controlling a plurality of motors to drive first infrared emitters, second infrared emitters, first infrared receivers, and second infrared receivers to rotate;

determining whether one electrical signal comprising the identification of one first infrared receiver and one electrical signal comprising the identification of one second infrared receiver are simultaneously received;

determining the corresponding set of coordinates of the first infrared receiver and the second infrared receiver to determine a set of coordinates of the touch spot according to a table and the electrical signals when one electrical signal comprising the identification of one of the first infrared receivers and one electrical signal comprising the identification of one of the second infrared receivers are simultaneously received; and determining an icon corresponding to the touch spot and executing the corresponding function according to the touch spot.

11. The touch method as described in claim 10, wherein the table comprises a first column recording the identification of each of the first infrared receivers and each of the second infrared receivers, and a second column recording the set of coordinates of the each of the first infrared receivers and each of the second infrared receivers.

12. The touch method as described in claim 10, wherein the angle between the first infrared emitters and the first side is from 0 degree to 90 degree or from 90 degree to 0 degree when the first infrared emitter is driven to rotate, the angle between the second infrared emitters and the second side is from 0 degree to 90 degree or from 90 degree to 0 degree when the second infrared emitter is driven to rotate, the angle between the first infrared receivers and the first side is from 0 degree to 90 degree or from 90 degree to 0 degree when the first infrared receiver is driven to rotate, and the angle between the second infrared receivers and the second side is from 0 degree to 90 degree or from 90 degree to 0 degree when the second infrared receiver is driven to rotate.

13. The touch method as described in claim 10, further comprises:

controlling the motors to drive each of the first infrared emitters and its corresponding infrared receiver to rotate in a different speed, and drive each of the second infrared emitters and its corresponding infrared receiver to rotate in a different speed.

14. The touch method as described in claim 10, wherein each of the infrared emitters emits an infrared ray within its preset frequency ranges, the frequency ranges of the infrared rays emitted by different first infrared emitters and different second infrared emitters are different, each of the first infrared receivers and each of the second infrared receivers receives the infrared ray emitted by its corresponding infrared emitter.

15. The touch method as described in claim 10, each of the first infrared receivers corresponds to one abscissa in the Descartes coordinate system, each of the second infrared receivers corresponds to one ordinate in the Descartes coordinate system.

16. The touch method as described in claim 15, wherein the coordinate origin is the intersection of the first side and the second side.

17. The touch method as described in claim 15, wherein the abscissa of each of the first infrared emitters is the same as that of its corresponding first infrared receiver, and the ordinate of each of the second infrared emitters is the same as that of its corresponding second infrared receiver.

18. The touch method as described in claim 10, wherein the distance between each two adjacent first infrared emitters is the same as that between each two adjacent second infrared emitters, and the distance between each two adjacent first infrared receivers is the same as that between each two adjacent second infrared receivers.

* * * * *